United States Patent [19]

Kovach et al.

[11] Patent Number: 5,105,073
[45] Date of Patent: Apr. 14, 1992

[54] CREDIT CARD READER EXTENDER

[75] Inventors: Albert J. Kovach, Sugar Grove; Michael S. Butkovich, Aurora, both of Ill.

[73] Assignee: Amoco Corporation, Chicago, Ill.

[21] Appl. No.: 621,822

[22] Filed: Dec. 4, 1990

[51] Int. Cl.$^5$ ..................... G06K 13/00; G06K 13/06
[52] U.S. Cl. ..................................... 235/482; 235/483
[58] Field of Search ........................ 235/482, 483, 485

[56] References Cited

U.S. PATENT DOCUMENTS

| | | | |
|---|---|---|---|
| 3,477,141 | 11/1969 | Davidson | 235/483 X |
| 3,914,789 | 10/1975 | Coker et al. | 235/482 X |
| 4,277,689 | 7/1981 | Thomas et al. | 235/482 X |
| 4,585,929 | 4/1986 | Brown et al. | 235/483 X |

Primary Examiner—David Trafton
Attorney, Agent, or Firm—Thomas W. Tolpin; William H. Magidson; Ralph C. Medhurst

[57] ABSTRACT

A credit card reader extender comprising an elongate generally rectangular body having a top side, a bottom side, a central portion and two end portions. The central portion has a generally rectangular opening therethrough extending from the bottom side to the top side and is adapted to be received over and to fit closely around a card reader of a card reading machine. The card reader is generally elongate and has a slot therein extending downwardly from the top side thereof into the card reader and longitudinally parallel to an elongate axis thereof. The end portions of the body each have a slot extending downwardly from the top side thereof into the body end portion and longitudinally parallel to an elongate axis of the body and in alignment and in registry with the slot in the card reader.

7 Claims, 2 Drawing Sheets

CREDIT CARD READER EXTENDER

BACKGROUND OF THE INVENTION

1. Field of the Invention

The present invention relates to a card reader extender which is adapted to be positioned over an existing credit card reader and which has slots therein on either side of the card reader that are adapted to register and be aligned with a slot in the card reader thereby to provide a longer, more stable line or path of guided travel through a magnetic or optical credit card reader whereby card reading errors and the need for manual card number entries are minimized if not altogether overcome

2. Description of the related art including information disclosed under 37 CFR Sections 1.97-1.99.

Any electronic cash register or card reading device such as, for example, the electronic cash register manufactured and sold by Koppens/Schlumberger under the trademark "MICRO-MAX" typically is fitted with a card reader sold under the trademark "MAGTEK" or other card reader which typically has a length less than twice the length of a credit card with a slot extending downwardly and longitudinally through the reader for receiving a credit card having a length of approximately 3.25 inches and a height or width of approximately 2 inches.

Typically, when the credit card is inserted in the reader, only about one-half of the card is engaged in the slot when the card first contacts a card reader element. This partial engagement situation inhibits a correct read of the card especially when the card is inserted by a new operator or by an experienced operator who is hurried, e.g., such as when there is a line of customers at the register. When there is a misread, a manual entry of the credit card number is required. Such manual entries create a time loss and a potential for theft, entry of wrong account numbers, and rejected sales due to entry of wrong account numbers.

As will be described in greater detail hereinafter, the credit card reader extender of the present invention provides a longer guide for the credit card through the card reader element thereby providing a longer, more stable path-of-travel which ensures proper presentation of the credit card to the card reader element.

As a result, it is believed that the credit card reader extender of the present invention will reduce the incidents of credit card misreads attributable to the operator who inserts the credit card improperly and thus will reduce potential fraud, will increase timeliness in processing credit card purchases and will avoid errors which can occur in manually keyed-in account numbers and result in rejected sales or billing errors.

Heretofore, various magnetic and optical card and tape readers have been proposed Examples of such readers are disclosed in the following patents:

| U.S. PAT. NO. | PATENTEE |
|---|---|
| 2,900,451 | Havstad |
| 3,612,832 | Goldstein et al. |
| 4,258,253 | Fisher |
| 4,585,929 | Brown et al. |
| 4,587,571 | Anderson et al. |
| 4,599,511 | Stiller |
| 4,743,746 | Murschall et al. |

-continued

| U.S. PAT. NO. | PATENTEE |
|---|---|
| 4,788,420 | Chang et al. |

The Havstad U.S. Pat. No. 2,900,451 discloses a tape reader head for a typical card reader. The card reader extender of the present invention is designed to fit over a card reader of the type disclosed in this patent to provide a longer and straighter credit card travel path.

The Goldstein et al. U.S. Pat. No. 3,612,832 discloses an embossed card reader for reading embossed account numbers and does not teach a card reader extender for enhancing the reading of magnetically or optically encoded credit cards.

The Fisher U.S. Pat. No. 4,258,253 and the Murschall et al U.S. Pat. No. 4,743,746 are directed to smart card readers. The smart card reader in the '746' patent has electronic circuits inside the card which the card reader will make electrical contact with and the '253' patent discloses a security card reader for reading coded information on a card. Neither of these patents teach or suggest a credit card reader extender.

The Brown et al. U.S. Pat. No. 4,585,929 discloses a card reader for reading a magnetic strip on a card and includes a modular element with notched portions for card entry. The magnetic strip card enters through the top through a notch formed by the joining of two notched elements and passes along a guide path formed by two guide elements. This patent does not disclose a card reader extender such as the card reader extender of the present invention which is received over an existing card reader whereby cards can be read with fewer passes of the card through the reader.

The Anderson et al. U.S. Pat. No. 4,587,571 is a motorized card reader. In contradistinction, the card reader extender of the present invention assists in the reading of cards by extending the front and back approach guidance of a credit card to and through a manual card reader.

The Stiller U.S. Pat. No. 4,599,511 discloses a security badge reader and is more akin to the card readers disclosed in U.S. Pat. Nos. 4,743,746 and 4,258,253.

The Chang et al. U.S. Pat. No. 4,788,420 discloses a card reader which provides a long slot for receiving a credit card. However, this patent does not disclose a credit card reader extender for mounting over and for use with an existing credit card reader having a short card travel path.

SUMMARY OF THE INVENTION

According to the invention there is provided a credit card reader extender comprising a body having a upper face or top side, a bottom side, a central portion and opposite end portions. The central portion has an opening therethrough extending from the bottom side to the top side and is adapted to be received over and to fit closely around a card reader having a slot therein extending inwardly from the top side or face thereof into the card reader and longitudinally parallel to an elongate axis thereof The end portions of the body each have a slot extending inwardly from the top side thereof into the body end portions and longitudinally parallel to an elongate axis of the body so as to align and register with the slot in the card reader. The slots in the card reader extender open onto the respective ends of the end portions and communicate with the slot in the card reader to form an extended pathway through the card reader and the card reader extender.

DESCRIPTION OF THE PREFERRED EMBODIMENT(S)

Figure 1:
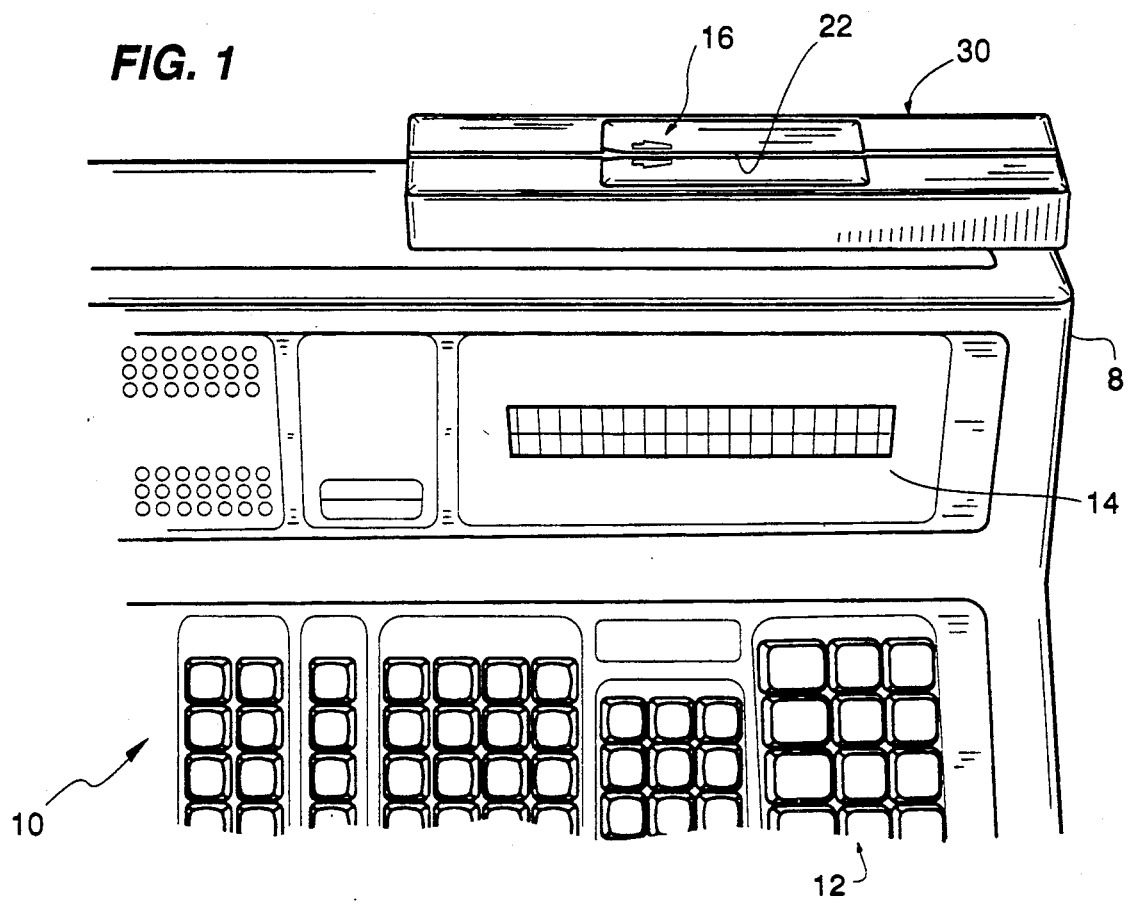
FIG. 1 is a fragmentary perspective view of the upper right hand corner of an electronic cash register at a gasoline service station viewing the same from above, and shows the credit card reader extender of the present invention positioned on and about a card reader of the cash register.

Referring now to the drawings in greater detail, there is illustrated in FIG. 1 the upper corner 8 of an electronic cash register 10 of the type utilized at a gasoline service station. The cash register 10 includes a keyboard 12, a visual display 14 and a credit card reader 16.

The card reader can be of the type sold under the trademark "MAGTEK" for use in a cash register 10 of the type sold by Koppens/Schlumberger under the trademark "MICRO-MAX". The card reader is typically 4 inches long and when a credit card 20 (FIG. 2) is placed in a slot 22 of the reader 16, half of the card 20 is sticking out. This design of the card reader 16 often inhibits a correct read of the card 20 for few operators or when an experienced operator is hurried (as in the case of a line of customers at the register). The misreads result in the necessity to make a manual entry of the credit card number. Such manual entries create a time loss and a potential for theft, wrong account number entries, and rejected sales.

According to the teachings of the present invention, these problems are solved by providing a credit card reader extender 30 constructed according to the teachings of the present invention for use with the card reader 16 for the purpose of lengthening the path-of-travel guide for the credit card 20 thereby providing a longer, more stable travel path for ensuring the proper presentation of the credit card 20 in the card reader 16.

As shown in FIGS. 1-4, the credit card reader extender 30 includes a generally rectangular body 32 with a generally rectangular opening 34 in a central portion 36 thereof.

End portions 38, 40 each have a slot 42, 44 therein aligned with a slot 44, 42 in the other and adapted to be aligned with the credit card slot 22 in the card reader 16.

Figure 2:
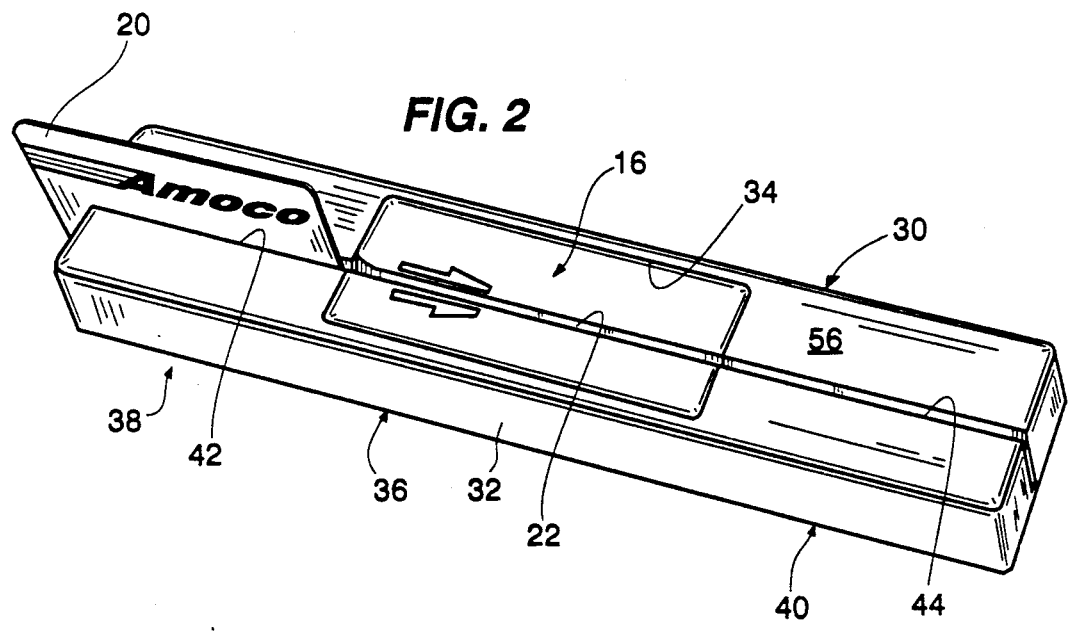
FIG. 2 is a perspective view of the credit card reader extender shown in FIG. 1 received over a card reader and shows a credit card positioned in the credit card reader extender for movement into the card reader.
Figure 3:
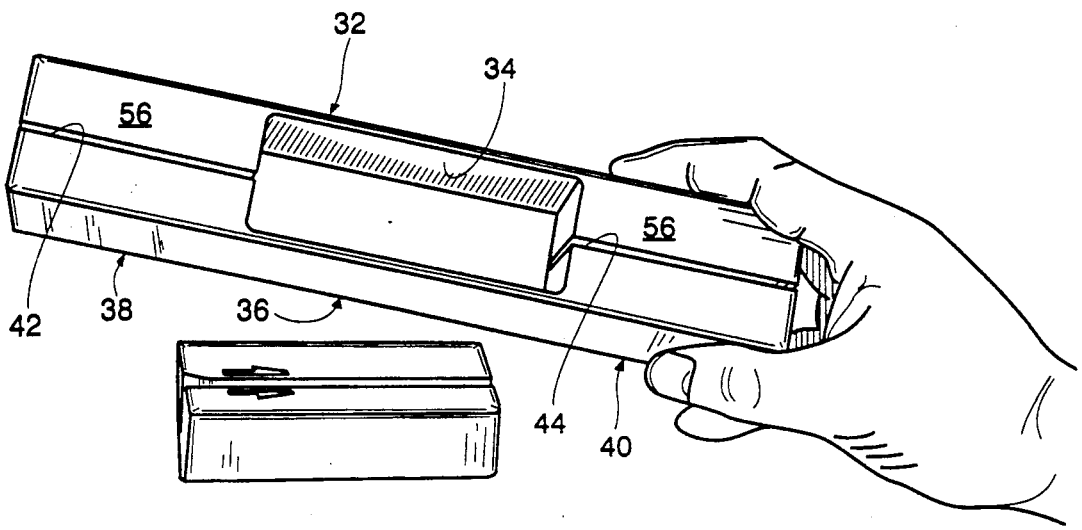
FIG. 3 is a perspective view of the credit card reader extender lifted off of the card reader.

The rectangular body 32 is approximately 10 inches long, inches wide and 1.125 inches high. The slots 42, 44 are sized to receive a credit card 20 as shown in FIG. 2. The rectangular opening 34 is sized to fit over a MAG-TEK TM TM M5-211 card reader 16

Figure 4:
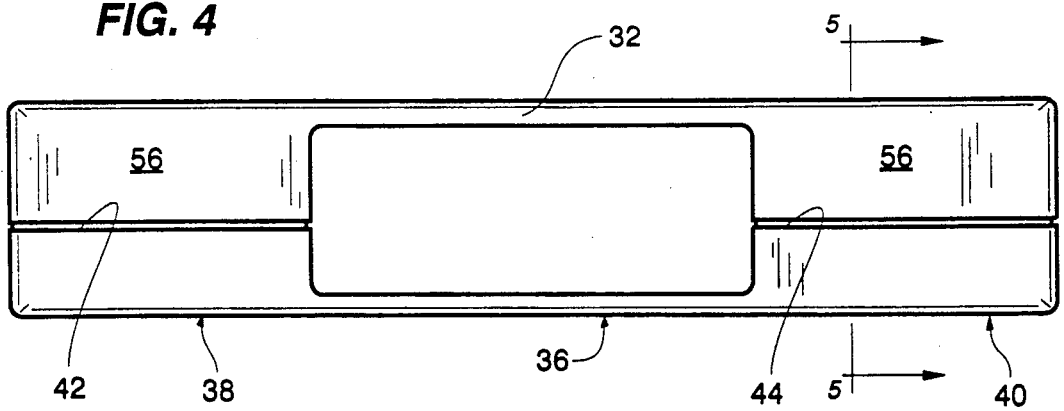
FIG. 4 is a top plan view of the credit card·reader extender.
Figure 5:
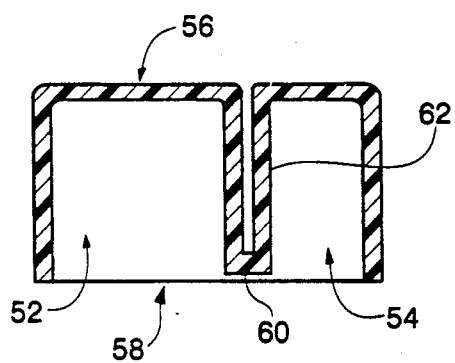
FIG. 5 is a vertical sectional view through the credit card reader extender and is taken along line 5—5 of FIG. 4.

As shown in FIGS. 4 and 5, the rectangular body 32 is molded as one piece from a plastic material and has hollow portions or cavities 52, 54 on the underside thereof on opposite sides of each of the slots 42, 44. One preferred plastic material from which the rectangular body 32 can be made is polypropylene.

The slots 42, 44 open onto a top side 56 of the body 32 while a bottom side 58 is open as shown in FIG. 5 except for the bottom edge 60 of an internal wall 62 in each end portion 38, 40. Each of the slots 42, 44 is formed in and extends through the internal wall 62 as shown in FIGS. 4 and 5.

The reader extender 30 when receiver over the card reader 16 presents a stable parallel path by reasons of the slots 42, 44 aligned and in registry with the slot 22 in the card reader 16 for the introduction of the credit card 20 to the credit card reader 16.

From the foregoing description, it will be apparent that the card reader extender 30 of the present invention has a number of advantages, some of which have been described herein and which are inherent in the invention. Also, modification can be made without departing from the teachings of the invention. Accordingly, the scope of the invention is only to be limited as necessitated by the accompanying claims.

We claim:

1. A card reader extender comprising a body having an upper face or top side, a bottom side, a central portion and opposite end portions, said central portion having an opening therethrough extending from said bottom side to said top side and being adapted to be received over and to fit closely around a card reader, the card reader having a slot therein extending inwardly from the top side or face thereof into the card reader and longitudinally parallel to an elongate axis thereof, and said end portions of said body each having a slot extending inwardly from the top side thereof into said body end portions and longitudinally parallel to an elongate axis of said body so as to align and register with the slot in the card reader, said slots in said card reader extender open onto the respective ends of the end portions and communicate with the slot in the card reader thereby to form an extended pathway through the card reader and said card reader extender.

2. The card reader extender of claim 1 being made of a plastic material.

3. The card reader extender of claim 2 wherein said plastic material is polypropylene.

4. The card reader extender of claim 1 wherein said body is elongate and generally rectangular and said opening is generally rectangular.

5. The card reader extender of claim 4 wherein said generally elongate rectangular body is a molded plastic shell having an open bottom side with said rectangular opening extending through the central portion thereof and with each end portion having first and second cavities extending upwardly from said bottom side into said end portion, each cavity being generally rectangular in shape and being located on either side of a longitudinally extending wall which is closed at its bottom side and which has one of said slots therein with each said slot opening onto said top side of said end portion.

6. The card reader extender of claim 1 wherein said body is approximately ten inches long, approximately two inches wide, and a little over one inch high.

7. The card reader extender of claim 6 wherein said height of said body is approximately 1.125 inches.

* * * * *

UNITED STATES PATENT AND TRADEMARK OFFICE
CERTIFICATE OF CORRECTION

PATENT NO. : 5,105,073
DATED : April 14, 1992
INVENTOR(S) : Albert J. Kovach, et. al.

It is certified that error appears in the above-indentified patent and that said Letters Patent is hereby corrected as shown below:

| Column | Line | |
|---|---|---|
| 1 | 16 | "overcome" should read -- overcome. -- |
| 1 | 58 | "proposed" should read -- proposed. -- |
| 2 | 47 | "rot" should read -- not -- |
| 2 | 62 | "thereof" should read -- thereof. -- |
| 3 | 37 | "few" should read -- new -- |
| 3 | 61 | before "inches" insert -- 2 -- |
| 3 | 64 | "M5" should read -- MT -- |

UNITED STATES PATENT AND TRADEMARK OFFICE
CERTIFICATE OF CORRECTION

PATENT NO. : 5,105,073
DATED : April 14, 1992
INVENTOR(S) : Albert J. Kovach, et. al.

It is certified that error appears in the above-indentified patent and that said Letters Patent is hereby corrected as shown below:

| Column | Line | |
|---|---|---|
| 3 | 64 | "16" should read -- 16.-- |

Signed and Sealed this

Twenty-eighth Day of September, 1993

Attest:

BRUCE LEHMAN

Attesting Officer

Commissioner of Patents and Trademarks